(12) United States Patent
Westermeier et al.

(10) Patent No.: US 11,591,072 B2
(45) Date of Patent: Feb. 28, 2023

(54) LINKAGE ASSEMBLIES FOR MOVING TABS ON CONTROL SURFACES OF AIRCRAFT

(71) Applicant: The Boeing Company, Chicago, IL (US)

(72) Inventors: Ross Michael Westermeier, Seattle, WA (US); Kevin Tsai, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 17/491,000

(22) Filed: Sep. 30, 2021

(65) Prior Publication Data

US 2022/0227480 A1 Jul. 21, 2022

Related U.S. Application Data

(60) Provisional application No. 63/140,133, filed on Jan. 21, 2021.

(51) Int. Cl.
*B64C 13/30* (2006.01)
*B64C 9/18* (2006.01)

(52) U.S. Cl.
CPC ............... *B64C 13/30* (2013.01); *B64C 9/18* (2013.01)

(58) Field of Classification Search
CPC .... B64C 9/16; B64C 9/18; B64C 9/20; B64C 13/30
See application file for complete search history.

(56) References Cited

U.S. PATENT DOCUMENTS

| 2,282,516 | A | * | 5/1942 | Hans | B64C 9/20 244/216 |
|---|---|---|---|---|---|
| 2,661,166 | A | * | 12/1953 | Gordon | B64C 9/20 244/216 |
| 3,480,235 | A | * | 11/1969 | Hans | B64C 23/005 244/216 |
| 3,528,632 | A | * | 9/1970 | Putman | B64C 9/16 244/215 |
| 3,985,319 | A | * | 10/1976 | Dean | B64C 9/16 244/216 |
| 4,049,219 | A | * | 9/1977 | Dean | B64C 9/20 244/217 |
| 2012/0280089 | A1 | * | 11/2012 | Keller | B64C 9/20 244/215 |
| 2019/0291851 | A1 | * | 9/2019 | Wagner | B64C 9/20 |

* cited by examiner

*Primary Examiner* — Richard G Davis
(74) *Attorney, Agent, or Firm* — Hanley, Flight & Zimmerman, LLC

(57) ABSTRACT

Linkage assemblies for moving tabs on control surfaces of aircraft are disclosed herein. An example aircraft includes a wing including a fixed wing portion and a trailing edge control surface. The trailing edge control surface includes a fore panel rotatably coupled to the fixed wing portion and an aft panel rotatably coupled to the fore panel. The wing also includes a linkage assembly including a rocking lever rotatably coupled to a bottom side of the fore panel, a trailing edge link having a first end rotatably coupled to the fixed wing portion and a second end rotatably coupled to the rocking lever, and an aft panel link having a first end rotatably coupled to the rocking lever and a second end rotatably coupled to a bottom side of the aft panel.

20 Claims, 7 Drawing Sheets

LINKAGE ASSEMBLIES FOR MOVING TABS ON CONTROL SURFACES OF AIRCRAFT

RELATED APPLICATION

This patent claims the benefit under 35 U.S.C. § 119(e) to U.S. Provisional Application No. 63/140,133, titled "Linkage Assemblies for Moving Tabs on Controls Surfaces of Aircraft," filed Jan. 21, 2021, which is hereby incorporated by this reference in its entirety.

FIELD OF THE DISCLOSURE

This disclosure relates generally to aircraft and, more particularly, to linkage assemblies for moving tabs on control surfaces of aircraft.

BACKGROUND

Aircraft commonly employ movable control surfaces along the leading and trailing edges of the wings. The control surfaces can be moved (e.g., in response to pilot command) relative to the fixed sections of the wings to control the lift and attitude of the aircraft. One type of movable control surface is an aileron. An aileron can be moved related to the fixed section of the wing to cause the aircraft to rotate about its longitudinal axis, referred to as roll.

SUMMARY

An example aircraft disclosed herein includes a wing including a fixed wing portion and a trailing edge control surface. The trailing edge control surface includes a fore panel rotatably coupled to the fixed wing portion and an aft panel rotatably coupled to the fore panel. The wing also includes a linkage assembly including a rocking lever rotatably coupled to a bottom side of the fore panel, a trailing edge link having a first end rotatably coupled to the fixed wing portion and a second end rotatably coupled to the rocking lever, and an aft panel link having a first end rotatably coupled to the rocking lever and a second end rotatably coupled to a bottom side of the aft panel.

Another example aircraft disclosed herein includes a wing including a fixed wing portion and a trailing edge control surface. The trailing edge control surface includes a fore panel rotatably coupled to the fixed wing portion and an aft panel rotatably coupled to the fore panel. The wing also includes an actuator to rotate the fore panel relative to the fixed wing portion and a linkage assembly coupled between the fixed wing portion, the fore panel, and the aft panel. The linkage assembly is configured to rotate the aft panel downward relative to the fore panel when the fore panel is rotated downward by the actuator, and rotate the aft panel upward relative to the fore panel when the fore panel is rotated upward by the actuator.

An example method disclosed herein includes activating an actuator to rotate a fore panel of a trailing edge control surface downward relative to a fixed wing portion of a wing of an aircraft. The trailing edge control surface includes an aft panel rotatably coupled to the fore panel. The wing further includes a linkage assembly coupled between the fixed wing portion, the fore panel, and the aft panel. When the actuator rotates the fore panel downward relative to the fixed wing portion, the linkage assembly rotates the aft panel downward relative to the fore panel.

BRIEF DESCRIPTION OF THE DRAWINGS

FIG. 4 illustrates an example linkage system used to move the example aft panel as the example fore panel is moved.

The figures are not to scale. In general, the same reference numbers will be used throughout the drawing(s) and accompanying written description to refer to the same or like parts.

Figure 1:
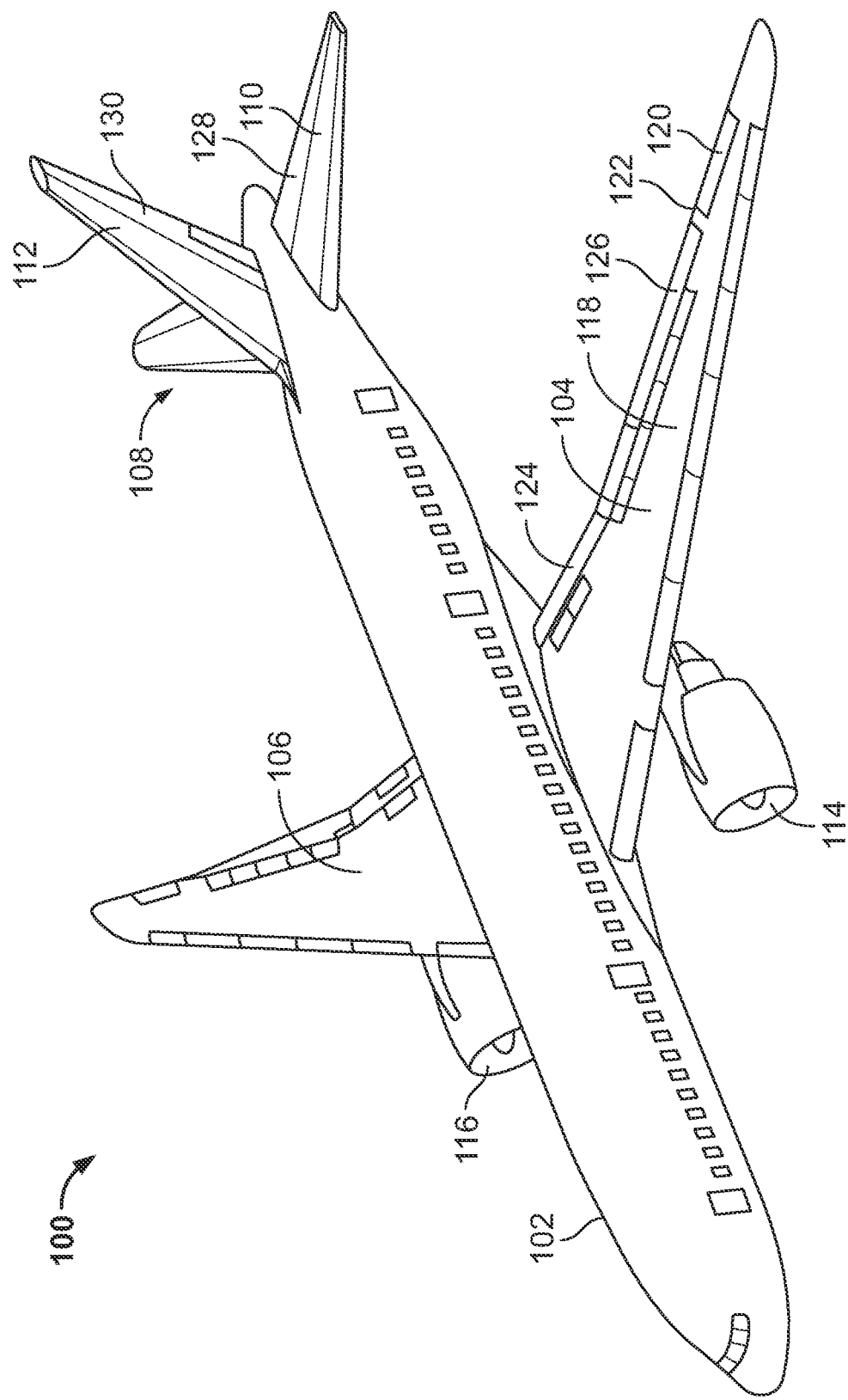
FIG. 1 illustrates an example aircraft in which the examples disclosed herein may be implemented.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Aircraft typically employ one or more movable control surfaces (sometimes referred to as auxiliary airfoils) along the leading and/or trailing edges of the wings, the horizontal stabilizers, and/or the vertical stabilizer. These movable control surfaces are used to control the lift and/or attitude of the aircraft during flight. Ailerons are a common type of trailing edge control surface that are movably coupled along the trailing edges wings of the aircraft. The ailerons can be rotated (via an actuation system) upward or downward relative to the fixed wing portions to cause the aircraft to roll (i.e., rotate about its longitudinal axis), also referred to as lateral motion or lateral control.

Some known ailerons include a single aileron surface that is pivotably (e.g., rotatably, hingeably, etc.) coupled to the fixed wing portion of the wing. It is often desirable to increase the deflection range of the aileron and/or the size of the aileron to achieve better lateral control. However, analytical and aerodynamic limitations (e.g., heavy loads) hinder increasing the deflection range and/or size of the aileron beyond certain limits.

Therefore, some aircraft utilize an actuator force-alleviating aileron design that includes a main aileron surface and a tab (sometimes referred to as a balance tab) along the aft edge of the main aileron surface. A linkage assembly moves the tab in the opposite direction as the main aileron surface. For example, if the main aileron surface is rotated downward relative to the fixed wing portion, the tab is rotated upward relative to the main aileron surface, and vice versa. This helps to reduce the load on the aileron and, thus, reduce the load on the pilot control device (e.g., a yoke). However, moving the tab in the opposite direction as the main aileron surface also reduces the total deflection and camber of the aileron and, thus, limits the achievable lateral control.

Disclosed herein are example linkage assemblies for aircraft that are configured to move (e.g., rotate) a tab in a same direction as a main surface of a trailing edge control surface. The example linkage assemblies disclosed herein can be implemented in connection with any type of trailing edge control surface having a tab, such as an aileron, a flap, an elevator, a rudder, etc. For example, an example linkage assembly disclosed herein can be implemented in connection with an aileron that is pivotably coupled along a trailing edge of a wing. The aileron includes a main aileron surface, referred to herein as a fore panel, and a tab, referred to herein as an aft panel. The fore panel is rotatably coupled to the fixed wing portion of the wing, and the aft panel is rotatably coupled to the fore panel. The wing includes an actuation system including an actuator to rotate the fore panel upward or downward relative to the fixed wing portion. The example linkage assembly is coupled between the fixed wing portion, the fore panel, and the aft panel. The example linkage assembly is configured to rotate the aft panel downward relative to the fore panel when the fore panel is rotated downward relative to the fixed wing portion, and the linkage assembly is configured to rotate the aft panel upward relative to the fore panel when the fore panel is rotated upward relative to the fixed wing portion. The example linkage assembly operates to move the aft panel in a passive manner as the fore panel is moved.

As disclosed above, the example linkage system is configured to move the aft panel (the tab) in the same direction relative to the fore panel (the main aileron surface). As a result, the aft panel (the tab) effectively magnifies or increases the deflection and camber of the aileron, thereby improving lateral control of the aircraft. The linkage assembly enables the aft panel (the tab) to effectively magnify or increase the deflection and camber of the aileron without increasing the size of the aileron or the deflection of the fore panel (the main aileron surface). Therefore, the example linkage assemblies disclosed herein increase the effectiveness of the aileron beyond the analytical and aerodynamic limitations of the single aileron surface design noted above.

FIG. 1 illustrates an example aircraft 100 in which the examples disclosed herein can be implemented. In the illustrated example, the aircraft 100 includes a fuselage 102, a first wing 104 (a left wing) coupled to the fuselage 102, a second wing 106 (a right wing) coupled to the fuselage 102, and an empennage 108 at an aft end of the fuselage 102. The empennage 108 has a horizontal stabilizer 110 and a vertical stabilizer 112. The aircraft 100 also includes a first engine 114 carried by the first wing 104 and a second engine 116 carried by the second wing 106. In other examples, the aircraft 100 may have multiple engines coupled to each of the first and second wings 104, 106 and/or disposed in other locations on the aircraft 100 (e.g., coupled to the fuselage 102, coupled to the empennage 108, etc.).

The first and second wings 104, 106, the horizontal stabilizer 110, and/or the vertical stabilizer 112 may have one or more control surfaces that are located along the leading and/or trailing edges of the respective components. Such control surfaces can be moved relative to the leading and/or trailing edges of the components to affect the lift and/or attitude (e.g., roll, pitch, and yaw) of the aircraft 100. For example, in FIG. 1, the first wing 104 has a fixed wing structure or portion 118 and an aileron 120 disposed along a trailing edge 122 of the fixed wing portion 118. The aileron 120 can be rotated or tilted upward or downward relative to the fixed wing portion 118 to cause the aircraft 100 to roll. The aircraft 100 includes an actuation system for moving the aileron 120 relative to the fixed wing portion 118. Example actuation systems are disclosed in further detail herein. In some examples, the first wing 104 may have multiple ailerons along the trailing edge 122 (e.g., an inboard aileron and an outboard aileron). The aileron 120 is one example of a trailing edge control surface. Another example of a trailing edge control surface is a flap. In the illustrated example, the first wing 104 has a first flap 124 (an inboard flap) and a second flap 126 (an outboard flap). The flaps 124, 126 may be deployed to generate more or less lift, which is typically used during take-off and landing. In other examples, the first wing 104 may include more or fewer flaps.

Similarly, the second wing 106 may include one or more trailing edge control surfaces, such as ailerons and/or flaps. Further, the empennage 108 may have one or more movable trailing edge control surfaces. For example, in FIG. 1, the horizontal stabilizer 110 includes a movable elevator 128 for controlling the pitch of the aircraft 100, and the vertical stabilizer 112 includes a movable rudder 130 for controlling the yaw of the aircraft 100. It is understood that any of the examples disclosed herein in connection with the aileron 120 of the first wing 104 can likewise be applied to the trailing edge control surfaces of the second wing 106, the horizontal stabilizer 110, and/or the vertical stabilizer 112. Thus, to avoid redundancy, a description of movable trailing edge control surfaces of these components is not provided herein.

Figure 2:
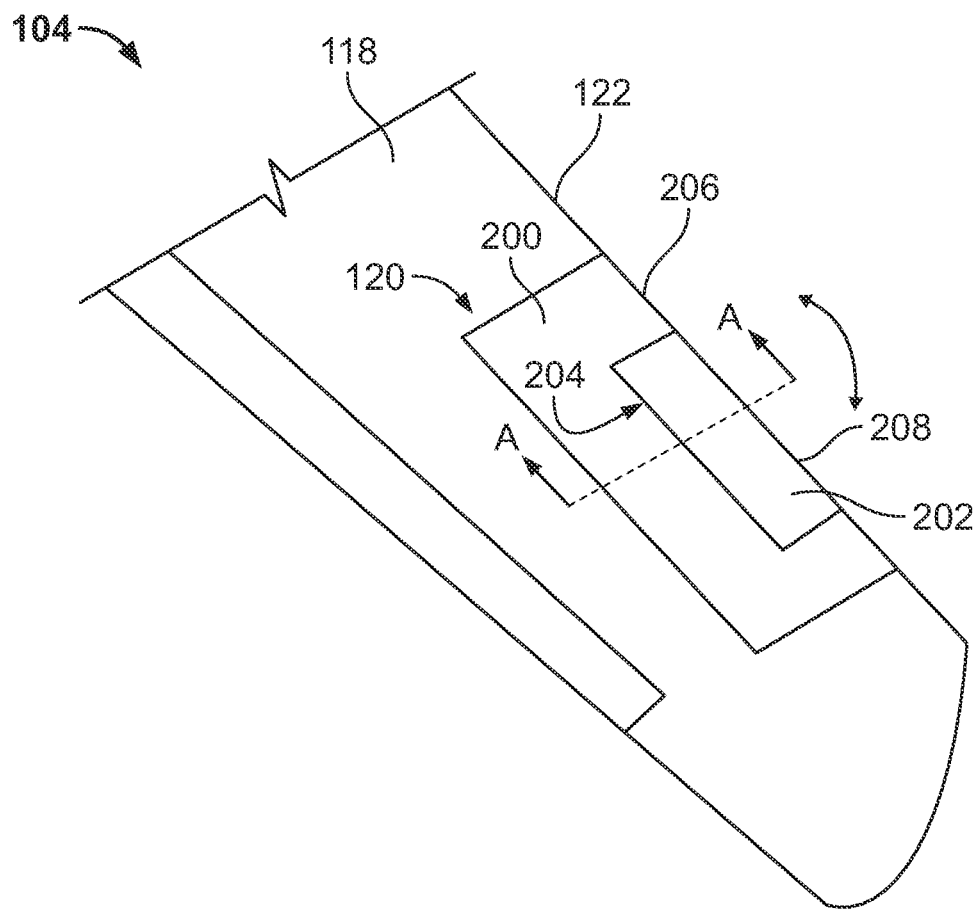
FIG. 2 is an enlarged view of one of the wings of the example aircraft of FIG. 1 showing an example aileron having a fore panel (a main aileron surface) and an aft panel (a tab).

FIG. 2 is an enlarged view of the first wing 104 and the aileron 120 (a trailing edge control surface) of the aircraft 100 of FIG. 1. The aileron 120 is rotatably (e.g., pivotably, hingeably, etc.) coupled to the fixed wing portion 118 of the first wing 104. The aileron 120 can be rotated upward or downward to roll the aircraft 100.

In some examples, the aileron 120 includes two more panels (sometimes referred to as movable sections). For example, as shown in FIG. 2, the aileron 120 includes a fore panel 200 and an aft panel 202. The fore panel 200 is a main aileron surface, and the aft panel 202 is a tab. The fore panel 200 is rotatably (e.g., pivotably, hingeably, etc.) coupled to the fixed wing portion 118 of the first wing 104, and the aft panel 202 is rotatably (e.g., pivotably, hingeably, etc.) coupled to the fore panel 200. In FIG. 2, the aileron 120 is shown in a neutral position, in which the fore and aft panels 200, 202 are substantially aligned with the inboard and outboard sections of the first wing 104. The fore panel 200 is rotatable upward and downward relative to the fixed wing portion 118, and the aft panel 202 is rotatably upward or downward relative to the fore panel 200 (and, thus, to the fixed wing portion 118).

In the illustrated example, the aft panel 200 is disposed in a notch 204 in the fore panel 200. An aft edge 206 of the fore panel 200 and an aft edge 208 of the aft panel 202 are aligned when the aileron 120 is in the neutral position. The aft edges 206, 208 are also aligned with the trailing edge 122 of the first wing 104 when the aileron 120 is in the neutral position.

Figure 3:
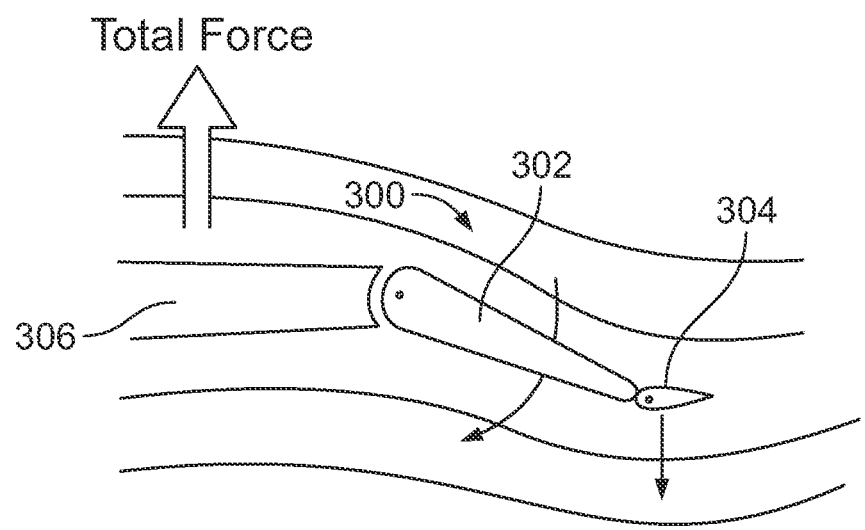
FIG. 3 is a side view of an actuator force-alleviating aileron configuration in which a tab rotates in the opposite direction as a main aileron surface.

Referring to FIG. 3, the aft panel (the tab) rotates in an opposite direction as the fore panel (the main aileron surface) to relieve or reduce moments imparted on the actuation systems that move the fore panel. FIG. 3 shows a side view of an actuator force-alleviating aileron 300 having a fore panel 302 and an aft panel 304 (a tab). The aileron 300 has an actuation system that move the aft panel 304 in the opposite direction as the fore panel 302. As shown in FIG. 3, when the fore panel 302 is rotated downward relative to a fixed wing portion 306, the aft panel 304 is rotated upward relative to the fore panel 302. Conversely, when the fore panel 302 is rotated upward related to the fixed wing portion 306, the aft panel 304 is rotated downward relative to the fore panel 302. This effect reduces moments imparted on the actuation system and the pilot control device (e.g., a yoke). However, this reduces airplane lateral control on these devices. The only way to increase such lateral control is through increasing the size or deflection of these panels, but aerodynamic and feasibility limitations hinder the ability to do so unrestrained.

Disclosed herein are example linkage systems that move the aft panel (the tab) in the same direction as the fore panel (the main aileron surface). As a result, the aft panel (the tab) effectively magnifies the deflection and camber of the fore panel (the main aileron surface), which increases the effective deflection and effective camber of the aileron to provide increased airplane lateral control, without increasing the size or deflection of the fore panel. The example linkage assemblies disclosed below are described in connection with the aileron 120. However, it is understood that the examples linkage assemblies disclosed herein can be similarly implemented in connection with any type of trailing edge control surface having a tab. For example, the example linkage assemblies disclosed herein can be implemented in connection with a flap, an elevator, a rudder, etc.

Figure 4:
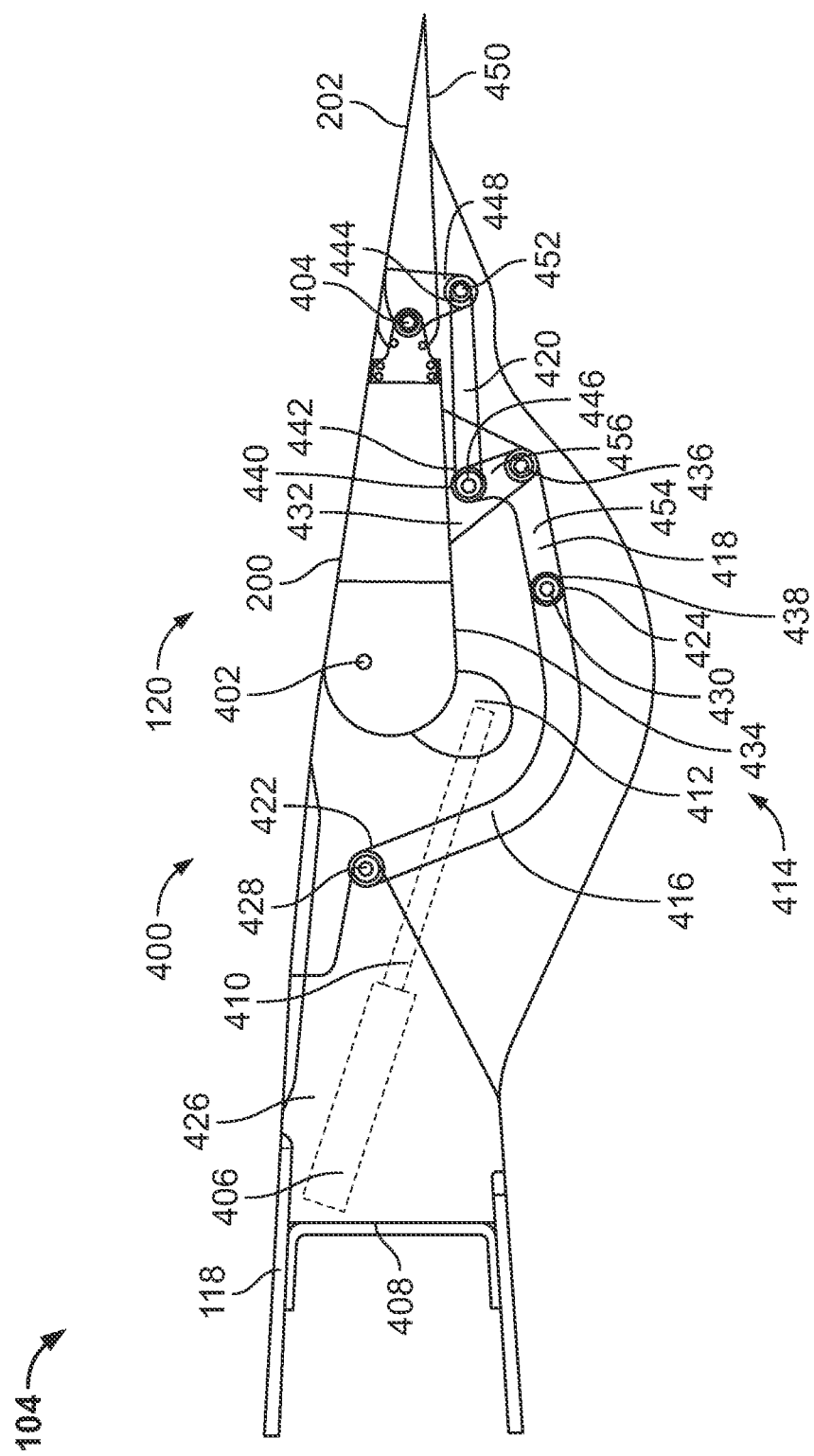
FIG. 4 is a cross-sectional view of the example wing and example aileron of FIG. 2 taken along line A-A in FIG. 2.

FIG. 4 is a cross-sectional view of the first wing 104 taken along line A-A of FIG. 2 showing an example actuation system 400 disclosed in accordance with the teachings of this disclosure. The example actuation system 400 can be used to rotate the aileron 120 upward or downward relative to the fixed wing portion 118 of the first wing 104. As shown in FIG. 4, the fore panel 200 is rotatably (e.g., pivotably, hingeably, etc.) coupled to the fixed wing portion 118 via a pivot 402 near a fore end of the fore panel 200. The fore panel 200 can be rotated downward (clockwise in FIG. 4) or upward (counter-clockwise in FIG. 4) about the pivot 402. The aft panel 202 is rotatably (e.g., pivotably, hingeably, etc.) coupled to the fore panel 200 via a pivot 404 near a fore end of the aft panel 202. The aft panel 202 can be rotated downward (clockwise in FIG. 4) or upward (counter-clockwise in FIG. 4) about the pivot 404.

As shown in FIG. 4, the actuation system 400 includes an actuator 406. The actuator 406 can be activated (e.g., in response to a pilot command) to move the aileron 120 relative to the fixed wing portion 118. In FIG. 4 the aileron 120 is shown in a neutral position. The actuator 406 can be activated to rotate the aileron 120 upward or downward relative to the fixed wing portion 118 to control the lateral motion of the aircraft 100. In the illustrated example, the actuator 406 is coupled to a rear spar 408 in the fixed wing portion 118 of the first wing 104. In some examples, the actuator 406 is pivotably or rotatably coupled to the rear spar 408. Additionally or alternatively, the actuator 406 can be coupled to another fixed structure in the first wing 104, such as a rib. The actuator 406 can be mechanically, hydraulically, and/or electrically actuated. In this example, the actuator 406 is a linear actuator and includes a movable rod 410. A distal end of the rod 410 is coupled (e.g., rotatably coupled) to an actuator mount 412 on the fore panel 200. As such, the distal end of the rod 410 is coupled to the fore panel 200. The actuator 406 can be activated to extend or move the rod 410 outward from the first wing 104, or the actuator 406 can be activated to retract the rod 410 toward the first wing 104. When the actuator 406 is activated to extend the rod 410, the rod 410 pushes the actuator mount 412 to the right in FIG. 4, thereby rotating the fore panel 200 upward (in the counter-clockwise direction in FIG. 4) relative to the fixed wing portion 118. When the actuator 406 is activated to retract the rod 410, the rod 410 pulls the actuator mount 412 to the left in FIG. 4, thereby rotating the fore panel 200 downward (in the clockwise direction in FIG. 4) relative to the fixed wing portion 118. In this manner, the actuator 406 can move the fore panel 200 between an upward position and a downward position (and/or any position between the upward and downward positions). The aft panel 202 is also moved with the fore panel 200, but can also be moved independently, as disclosed in further detail below.

The example actuation system 400 also includes an example linkage assembly 414 (which may be referred to as a tab actuation or linkage system). The linkage assembly 414 is coupled between the fixed wing portion 118, the fore panel 200, and the aft panel 202. The linkage assembly 414 is configured to move the aft panel 202 (the tab) relative to the fore panel 200 when the fore panel 200 is moved relative to the fixed wing portion 118. In particular, the linkage assembly 414 is configured to rotate the aft panel 202 downward relative to the fore panel 200 when the fore panel 200 is rotated downward by the actuator 406, and rotate the aft panel 202 upward relative to the fore panel 200 when the fore panel 200 is rotated upward by the actuator 406. In this example, the linkage assembly 414 acts to passively move the aft panel 202 when the fore panel 200 is moved by the actuator 406. In other words, a separate actuator is not used for moving the aft panel 202. Instead, the linkage assembly 414 moves the aft panel 202 based on movement of the fore panel 200 caused by the actuator 406.

In the illustrated example, the linkage assembly 414 includes a trailing edge link 416, a rocking lever 418 (sometimes referred to as a rocker or bellcrank), and an aft panel link 420. The trailing edge link 416 has a first end 422 and a second end 424 opposite the first end 422. The first end 422 of the trailing edge link 416 is rotatably coupled to a fixed structure in the fixed wing portion 118. For example, in the illustrated example, the first end 422 is rotatably coupled to a rib 426 of the fixed wing portion 118 via a joint or coupling 428. The second end 424 of the trailing edge link 416 is rotatably coupled to the rocking lever 418 via a joint or coupling 430. As such, the trailing edge link 416 is coupled between the fixed wing portion 118 and the rocking lever 418. In the illustrated example, the trailing edge link 416 is curved between the first and second ends 422, 424. In some examples, the trailing edge link 416 is curved to ensure the trailing edge link 416 remains clear of the fore panel 200 when the aileron 120 is rotated upward (e.g., as shown in the sequence of FIGS. 6A-6E). In other examples, the trailing edge link 416 may have a different shape or profile. For instance, in another example, a slot may be provided on a bottom side 434 (e.g., a lower skin) of the fore panel 200 to enable the trailing edge link 416 to pass through a portion of the fore panel 200. In such an example, the trailing edge link 416 may a straight link.

In the illustrated example, the fore panel 200 has a bracket or mount 432 on a bottom side 434 of the fore panel 200. The rocking lever 418 is rotatably coupled to the mount 432 on the fore panel 200 via a joint or coupling 436. As such, the rocking lever 418 is rotatably coupled to the bottom side 434 of the fore panel 200. The rocking lever 418 has a first end 438 and a second end 440 opposite the first end 438. In the illustrated example, the second end 424 of the trailing edge link 416 is rotatably coupled to the first end 438 of the rocking lever 418 via the coupling 430.

In the illustrated example, the aft panel link 420 has a first end 442 and a second end 444 opposite the first end 442. The aft panel link 420 is coupled between the rocking lever 418 and the aft panel 202. The first end 442 of the aft panel link 420 is rotatably coupled to the second end 440 of the rocking lever 418 via a joint or coupling 446. In the illustrated example, the aft panel 202 has a bracket or mount 448 on a bottom side 450 of the aft panel 202. The second end 444 of the aft panel link 420 is rotatably coupled to the mount 448 on the aft panel 202 via a joint or coupling 452. As such, the aft panel link 420 is rotatably coupled to the bottom side 450 of the aft panel 202 (the tab). As shown in further detail in conjunction with FIGS. 5A-5E and 6A-6E, when the fore panel 200 is rotated upward or downward relative to the fixed wing portion 118, the rocking lever 418 causes the aft panel link 420 to rotate the aft panel 202 in the same direction relative to the fore panel 200.

In the illustrated example, the rocking lever 418 has a first arm 454 and a second arm 456. The first and second arms 454, 456 extend in different directions. The rocking lever 418 may be a substantially unitary part or component. In the illustrated example, the first and second arms 454, 456 are about 90° (e.g., ±5°) apart (e.g., perpendicular). As such, the rocking lever 418 has an L-shaped profile. In other examples, the first and second arms 454, 456 may be closer to or further apart from each other (e.g., 10°, 30°, 60°, 120°, etc.). The rocking lever 418 is rotatably coupled to the bottom side 434 of the fore panel 200 (via the coupling 436) at an intersection of the first and second arms 454, 456. The second end 424 of the trailing edge link 416 is rotatably coupled to the first arm 454, and the first end 442 of the aft panel link 420 is rotatably coupled to the second arm 456. In the illustrated example, the first arm 454 is longer than the second arm 456. As such, a larger angular rotation of the first arm 454 (provided from movement of the fore panel 200) is converted to smaller angular rotation in the second arm 456 (provided to the aft panel 202). This arrangement also converts a smaller force from the fore panel 200 (provided by the actuator 406) to a larger force for moving and controlling the aft panel 202. Conversely, a larger load on the aft panel 202 is converted to a smaller load on the fore panel 200 and, thus, a smaller load on the actuation system 400. In other examples the relative lengths of the first and second arms 454, 456 may be different.

Any of the example pivots (e.g., pivots 402, 404) or couplings (e.g., couplings 428, 430, 436, 446, 452) disclosed herein can be implemented by any type of connection that enables rotation between two components in at least a 2D plane. For example, any of the pivots or couplings can be implemented by a pin, a journal bearing, a spherical bearing, etc.

Figure 5A:
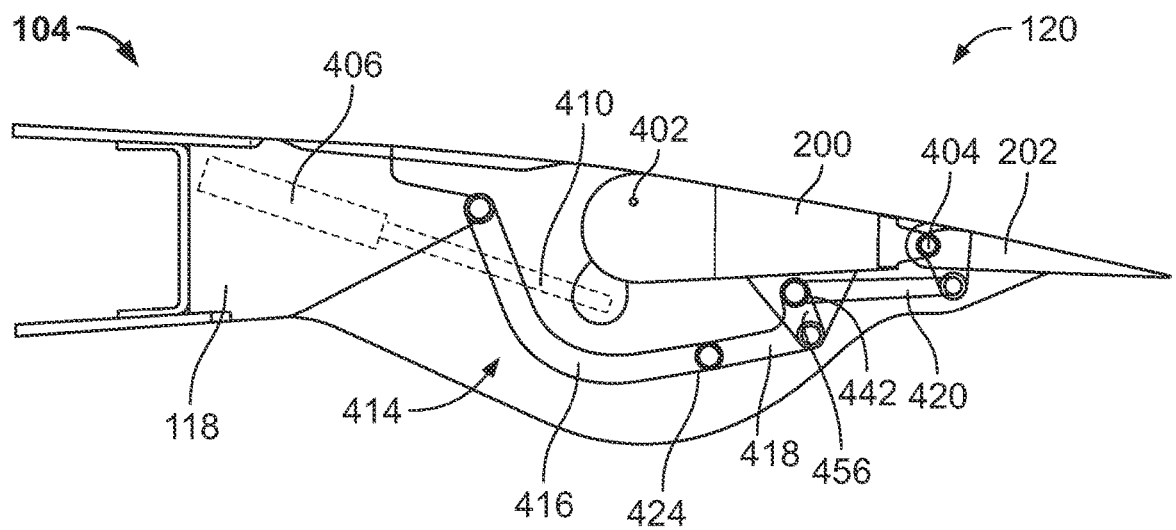
FIGS. 5A-5E show an example sequence in which the example aileron of FIG. 4 is moved from a neutral position (FIG. 5A) to a downward position (FIG. 5E).
Figure 5B:
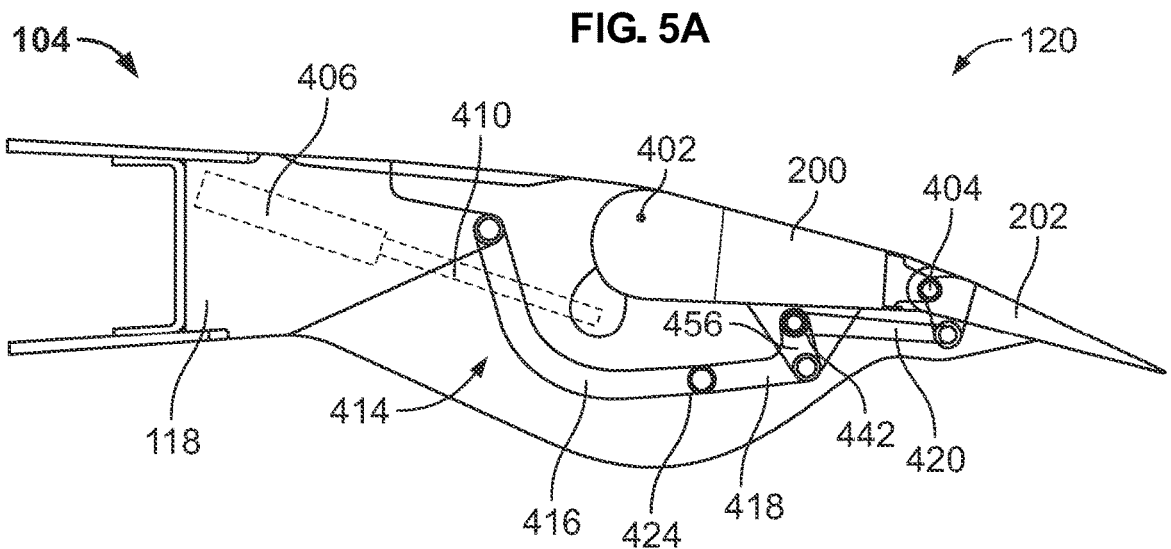
Figure 5C:
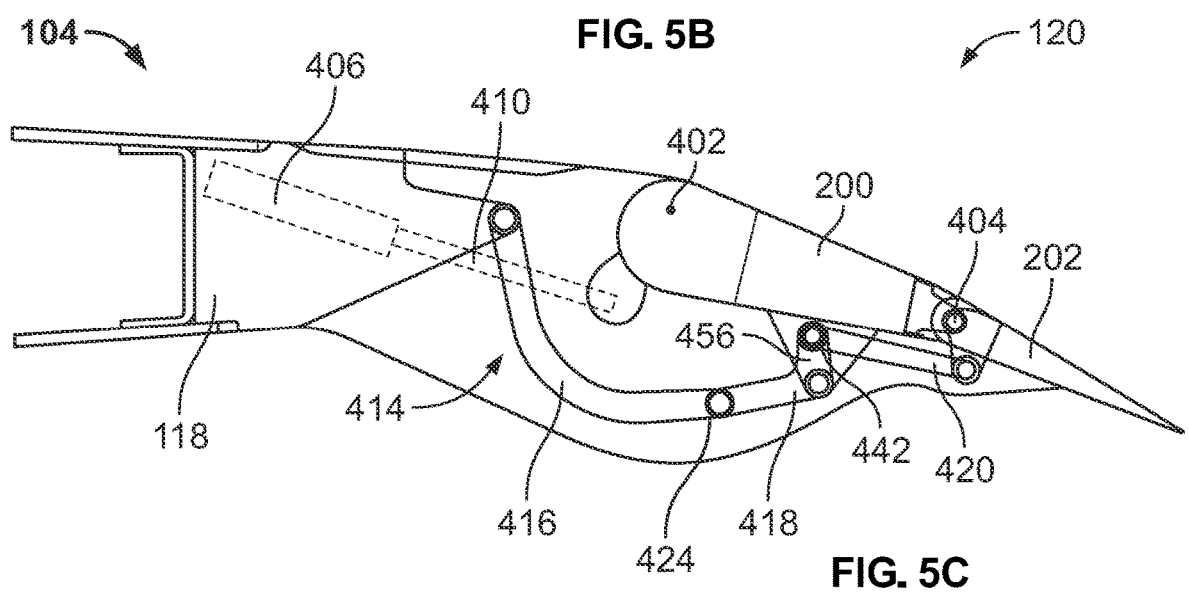
Figure 5D:
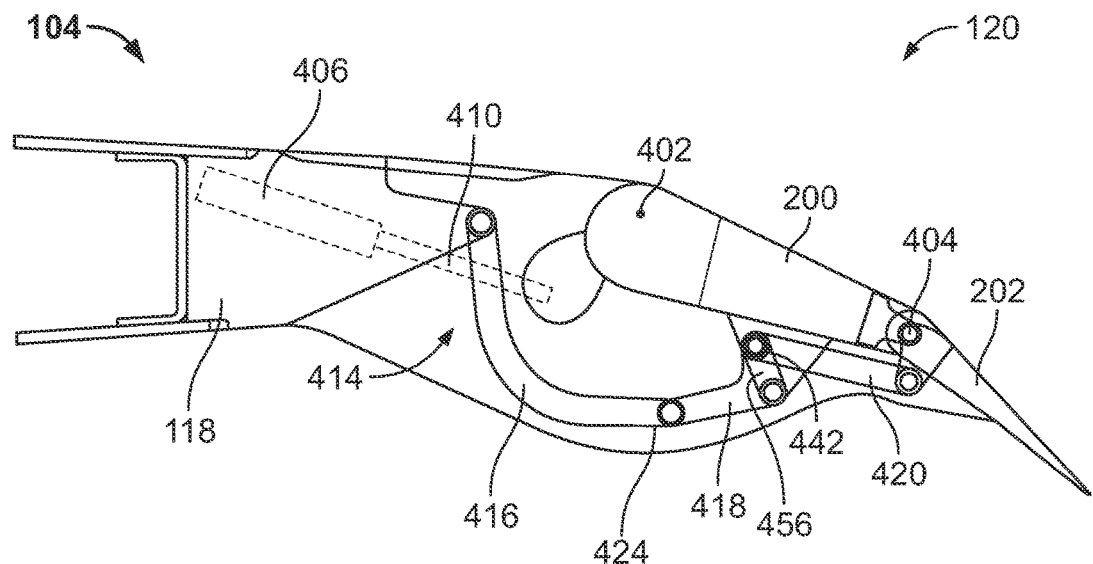
Figure 5E:
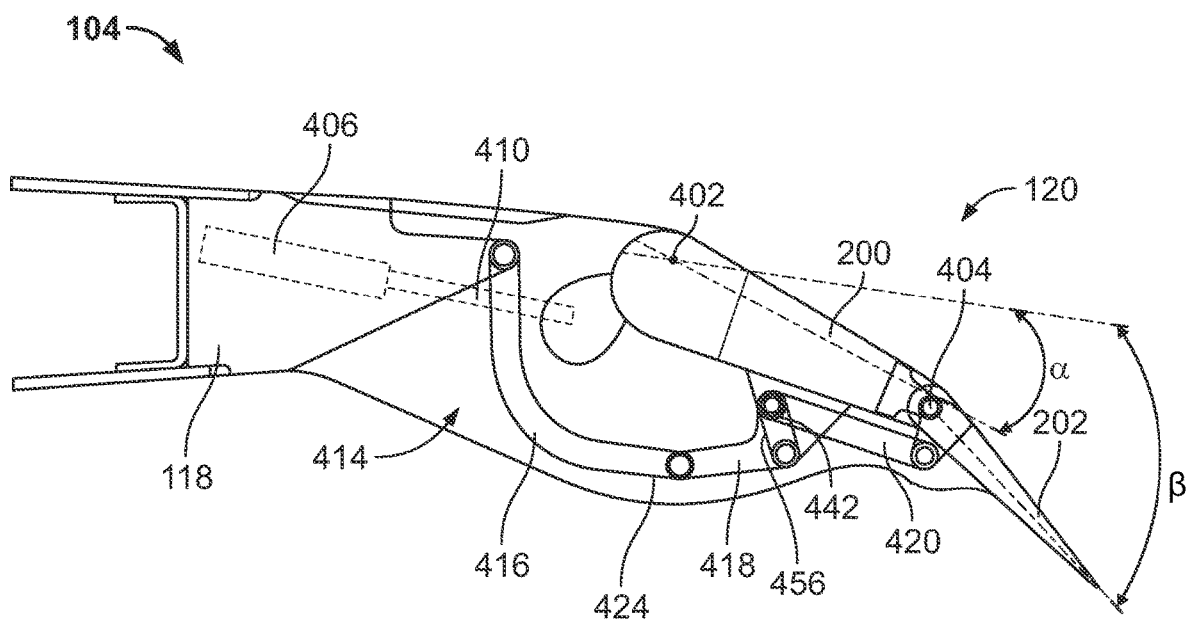

FIGS. 5A-5E show an example sequence in which the aileron 120 is moved from the neutral position (FIG. 5A) to a downward position (FIG. 5E). This results in more lift on the section of the first wing 104 having the aileron 120, which can be used to roll the aircraft 100 (FIG. 1) (e.g., roll to the right). The example sequence shown in FIGS. 5A-5E illustrates how the example linkage assembly 414 moves the aft panel 202 downward relative to the fore panel 200 when the fore panel 200 is moved downward relative to the fixed wing portion 118.

FIG. 5A shows the aileron 120 in the neutral position. In the neutral position, the fore and aft panels 200, 202 are considered stowed and aligned with the fixed wing portion 118. This eliminates drag caused by the fore and aft panels 200, 202. The aileron 120 may be held in the neutral position during cruise, for example. To move the aileron 120 from the neutral position (FIG. 5A) to the downward position (FIG. 5E), the actuator 406 is activated to retract the rod 410. The actuator 406 may be activated in response to a command from a pilot (e.g., from movement of a yoke). As the rod 410 is retracted (e.g., moved to the left in FIGS. 5A-5E), the rod 410 rotates the fore panel 200 downward (in the clockwise direction in FIGS. 5A-5E). The fore panel 200 rotates about the pivot 402. As the fore panel 200 rotates downward, the fore panel 200 moves the rocking lever 418 downward. The second end 424 of the trailing edge link 416 follows this movement downward and causes the rocking lever 418 to rotate in the counter-clockwise direction in FIGS. 5A-5E. As a result, the second arm 456 of the rocking lever 418 pulls the first end 442 of the aft panel link 420 to the left in FIGS. 5A-5E. This causes the aft panel link 420 to rotate the aft panel 202 downward (in the clockwise direction in FIGS. 5A-5E) relative to the fore panel 200. The aft panel 202 rotates about the pivot 404. As shown in the example sequence, the fore panel 200 is angled downward relative to the fixed wing portion 118 of the first wing 104, and the aft panel 202 is angled downward from the fore panel 200. As such, the aft panel 202 is rotated in the same direction as the fore panel 200. Thus, the aileron 120 (including the fore and aft panels 200, 202), forms a downward curved profile. This curvature results in a relatively large effective deflection and camber without having to increase the size of the aileron 120 or the deflection of the fore panel 200. This results in more lateral control authority than other aileron configurations. Further, in the downward direction deployment shown in FIGS. 5A-5E, the increase in effective deflection and camber is more gradual than a single aileron panel at, for example, 30° downward, which may likely stall out and not be as effective at producing lift and rolling the aircraft 100.

In the final position shown in FIG. 5E, the aft panel 202 is not aligned with the fore panel 200. Instead, the aft panel 202 is angled further downward relative to the fixed wing portion 118 than the fore panel 200. For example, as shown in FIG. 5E, the fore panel 200 is at a first angular position α relative to the neutral position, and the aft panel 202 is at a second angular position β relative to the neutral position, which is greater than the first angular position α. This effectively increases the deflection and camber of the section of the first wing 104 with the aileron 120, thereby giving the aircraft 100 more lateral control. In some examples, the difference between the first angular position α and the second angular position β is about 20° (e.g., ±5°). In other examples, the linkage assembly 414 can be configured to move the aft panel 202 more or less relative to the fore panel 200 (e.g., 5°, 10°, 15°, 25°, etc.).

Figure 6A:
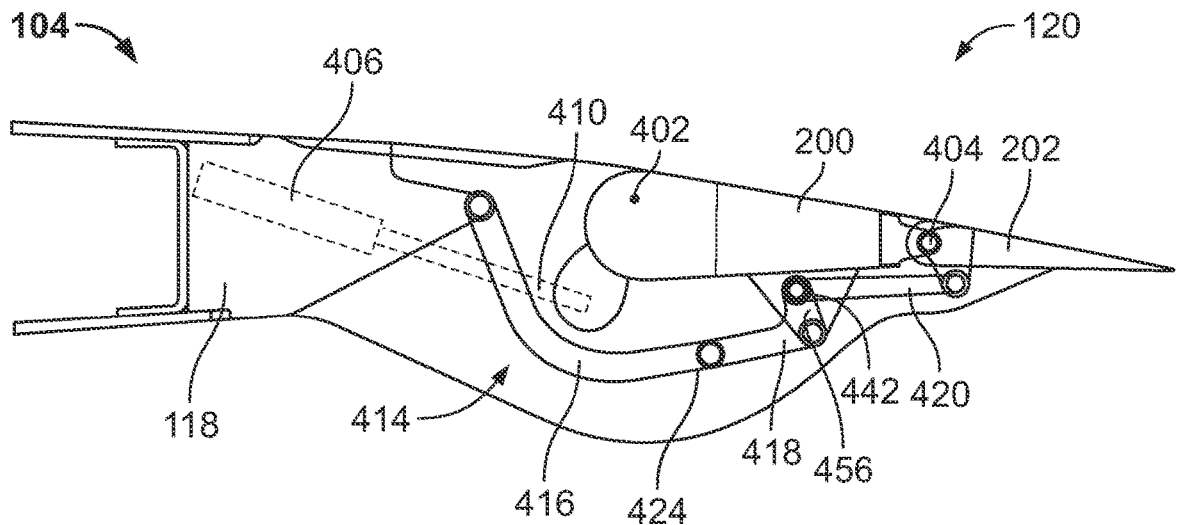
FIGS. 6A-6E show an example sequence in which the example aileron of FIG. 4 is moved from a neutral position (FIG. 6A) to an upward position (FIG. 6E).
Figure 6B:
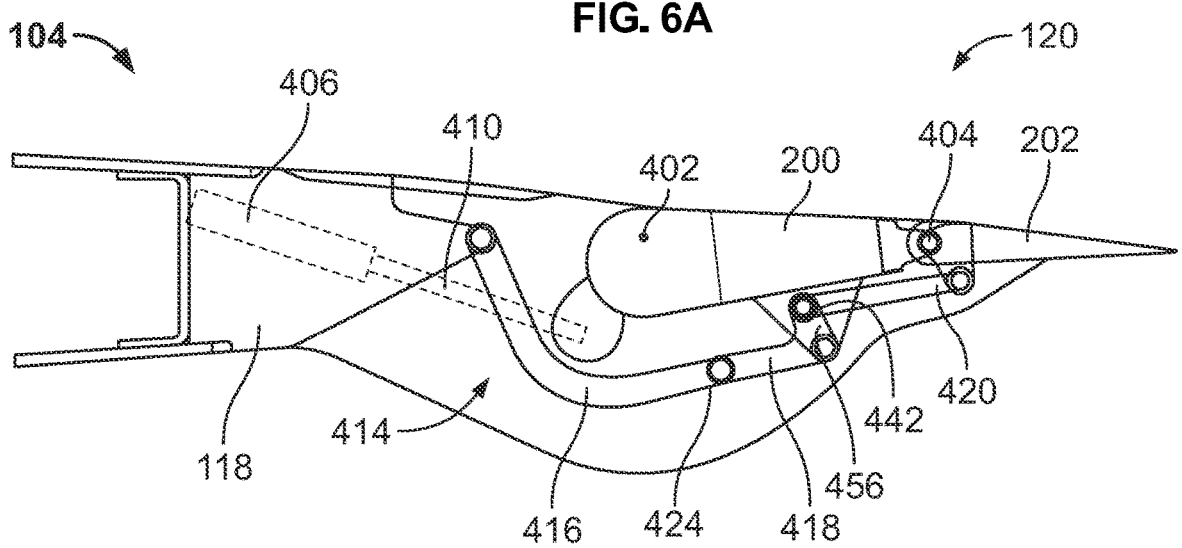
Figure 6C:
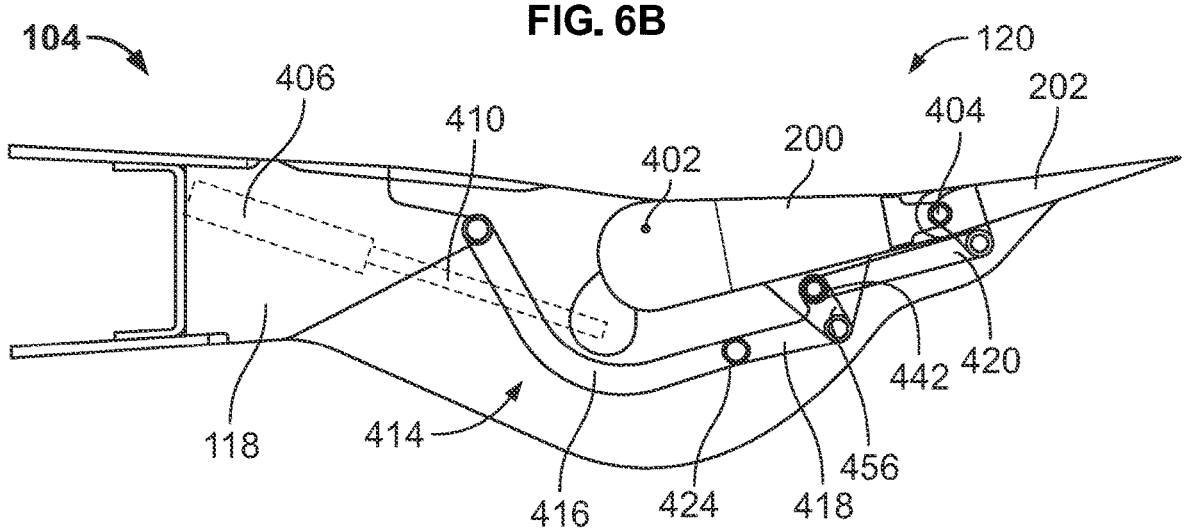
Figure 6D:
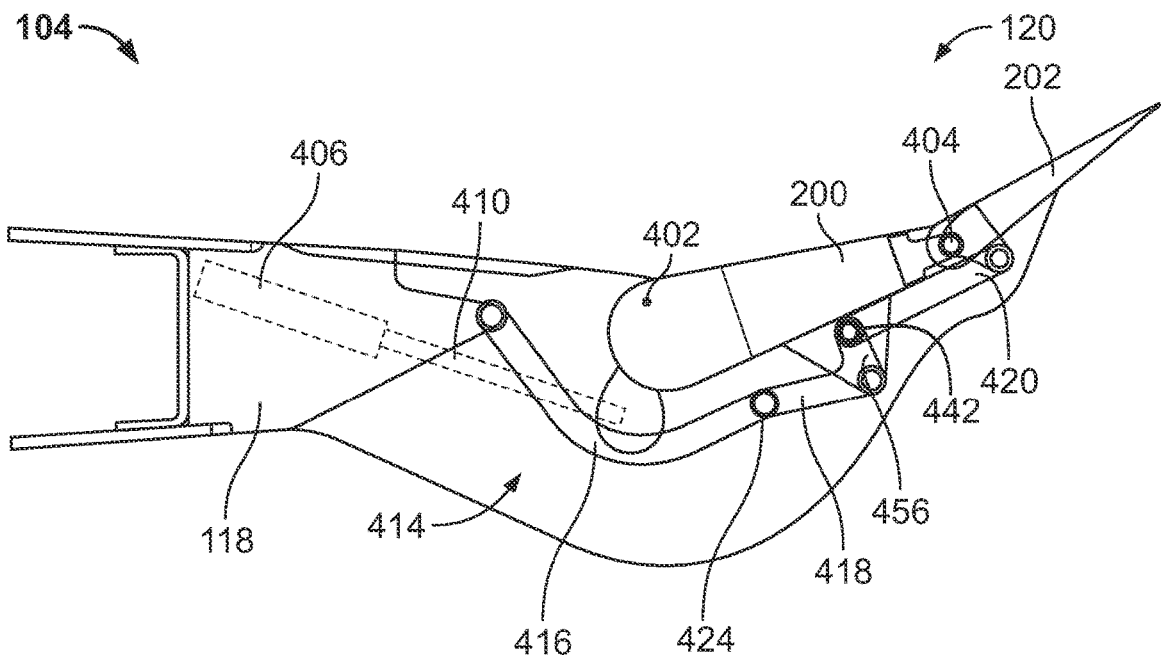
Figure 6E:
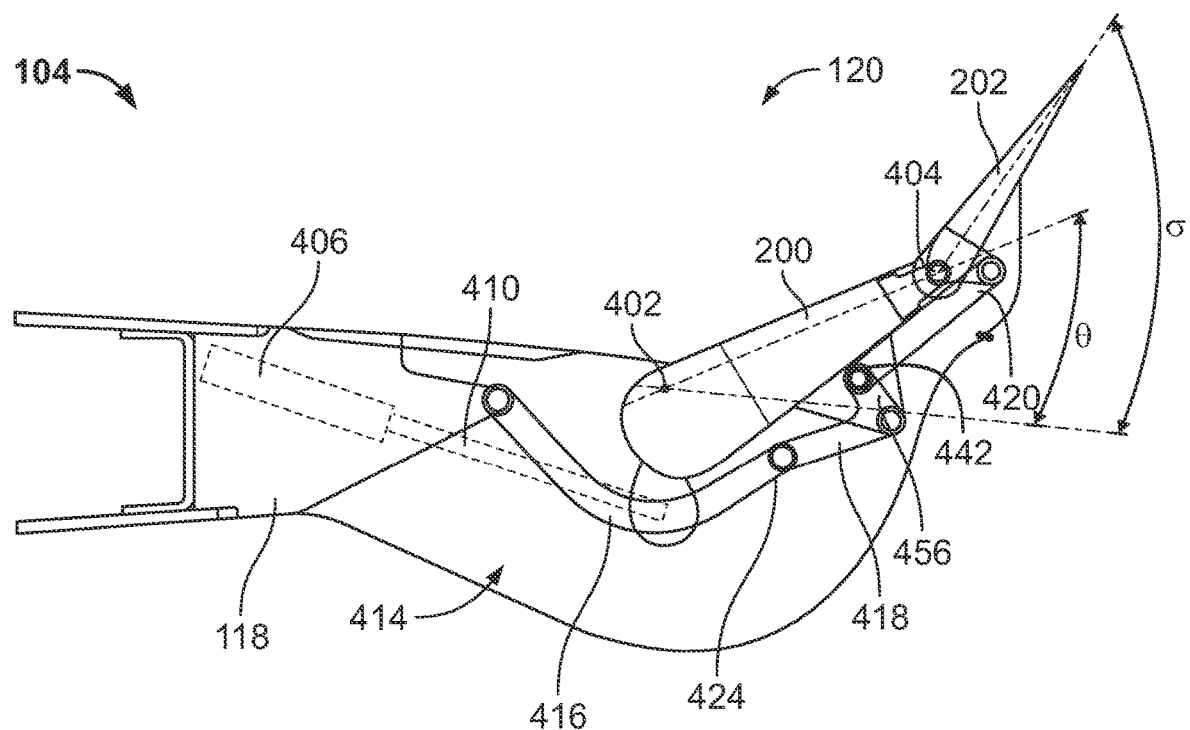

FIGS. 6A-6E show an example sequence in which the aileron 120 is moved from the neutral position (FIG. 6A) to an upward position (FIG. 6E). This results in less lift on the section of the first wing 104 including the aileron 120, which can be used to roll the aircraft 100 (e.g., roll to the left). The example sequence shown in FIGS. 6A-6E illustrates how the example linkage assembly 414 moves the aft panel 202 upward relative to the fore panel 200 is moved upward relative to the fixed wing portion 118.

FIG. 6A shows the aileron 120 in the neutral position. To move the aileron 120 from the neutral position (FIG. 6A) to the upward position (FIG. 6E), the actuator 406 is activated to extend the rod 410. As the rod 410 is extended (e.g., moved to the right in FIGS. 6A-6E), the rod 410 rotates the fore panel 200 upward (in the counter-clockwise direction in FIGS. 6A-6E). The fore panel 200 rotates about the pivot 402. As the fore panel 200 rotates upward, the fore panel 200 moves the rocking lever 418 upward. The second end 424 of the trailing edge link 416 follows this movement downward and causes the rocking lever 418 to rotate in the clockwise direction in FIGS. 6A-6E. As a result, the second arm 456 of the rocking lever 418 pushes the first end 442 of the aft panel link 420 to the right in FIGS. 6A-6E. This causes the aft panel link 420 to rotate the aft panel 202 upward (in the counter-clockwise direction in FIGS. 6A-6E) relative to the fore panel 200. The aft panel 202 rotates about the pivot 404. As shown in the example sequence, the fore panel 200 is angled upward relative to the fixed wing portion 118 of the first wing 104, and the aft panel 202 is angled upward from the fore panel 200. As such, the aft panel 202 is rotated in the same direction as the fore panel 200. Thus, the aileron 120 (including the fore and aft panels 200, 202), forms an upward curve profile. This curvature results in a relatively large effective deflection and camber without having to increase the size of the aileron 120 or the deflection of the fore panel 200. This results in more lateral control authority than other aileron configurations when compared to similar upward deflections of the main panel.

In the final position shown in FIG. 6E, the aft panel 202 is not aligned with the fore panel 200. Instead, the aft panel 202 is angled further upward relative to the fixed wing portion 118 than the fore panel 200. For example, as shown in FIG. 6E, the fore panel 200 is at a third angular position θ relative to the neutral position, and the aft panel 202 is at a fourth angular position σ relative to the neutral position, which is greater than the third angular position θ. This effectively increases the deflection and camber of the section of the first wing 104 with the aileron 120, thereby giving the aircraft 100 more lateral control. In particular, this additional deflection allows the aileron 120 to further reduce lift from the first wing 104 and, thus, provide added rolling authority to the aircraft 100. In some examples, the difference between the third angular position θ and the fourth angular position σ is about 20° (e.g., ±5°). In other examples, the linkage assembly 414 can be configured to move the aft panel 202 more or less relative to the fore panel 200 (e.g., 5°, 10°, 15°, 25°, etc.).

Also disclosed herein are example methods of moving the aft panel 202 with the example linkage system 414. An example method includes activating the actuator 406 to rotate the fore panel 200 of the aileron 120 (a trailing edge control surface) downward relative to the fixed wing portion 118 of the first wing 104 of the aircraft 100. An example of this method is shown in the sequence in FIGS. 5A-5E. As disclosed herein, the linkage assembly 414 is coupled between the fixed wing portion 118, the fore panel 200, and the aft panel 202, and the linkage assembly 414 is configured to move the aft panel 202 in the same direction that the fore panel 200 is moved. As a result, when the actuator 406 rotates the fore panel 200 downward relative to the fixed wing portion 118, the linkage assembly 414 rotates the aft panel 202 downward relative to the fore panel 200. Additionally or alternatively, the example method can include activating the actuator 406 to rotate the fore panel 200 upward relative to the fixed wing portion 118. An example of this method is shown in the sequence in FIGS. 6A-6E. When the actuator 406 rotates the fore panel 200 upward relative to the fixed wing portion 118, the linkage assembly 414 rotates the aft panel 202 upward relative to the fore panel 200. The actuator 406 can be activated in response to a command from the pilot (e.g., based on movement of a yoke). The actuator 406 can move the aileron 120 to any position between the downward position shown in FIG. 5E and the upward position shown in FIG. 6E.

While the example linkage assembly 414 disclosed above is described in connection with a tab arrangement in which the aft panel 202 is disposed in the notch 204 of the fore panel 200, the example linkage assemblies disclosed herein can also be implemented in connection with other tab arrangements. For example, in other arrangements, the aft panel 202 can be rotatably coupled to the aft edge 206 of the fore panel 200. The example linkage assembly 414 can be similarly implemented to move the aft panel 202 in the same direction as the fore panel 200.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example apparatus, systems, methods, and articles of manufactured have been disclosed that enable a tab of a control surface to move in a same direction as a main portion of the control surface. The examples disclosed herein effectively increase the deflection and camber of the control surface without having to physically increase the size of the control surface or increase the deflection of the main portion of the control surface. This increase in effective deflection and camber enhances control of the aircraft.

The following paragraphs provide various examples of the examples disclosed herein.

Example is an aircraft including a wing including a fixed wing portion and a trailing edge control surface. The trailing edge control surface includes a fore panel rotatably coupled to the fixed wing portion and an aft panel rotatably coupled to the fore panel. The wing also includes a linkage assembly including a rocking lever rotatably coupled to a bottom side of the fore panel, a trailing edge link having a first end rotatably coupled to the fixed wing portion and a second end rotatably coupled to the rocking lever, an aft panel link having a first end rotatably coupled to the rocking lever and a second end rotatably coupled to a bottom side of the aft panel.

Example 2 includes the aircraft of Example 1, wherein the trailing edge control surface is an aileron.

Example 3 includes the aircraft of Example 2, wherein the aft panel is a tab.

Example 4 includes the aircraft of any of Examples 1-3, wherein the rocking lever has a first arm and a second arm extending in different directions.

Example 5 includes the aircraft of Example 4, wherein the second end of the trailing edge link is rotatably coupled to the first arm, and the first end of the aft panel link is rotatably coupled to the second arm.

Example 6 includes the aircraft of Example 5, wherein the rocking lever is rotatably coupled to the bottom side of the fore panel at an intersection of the first and second arms.

Example 7 includes the aircraft of any of Examples 4-6, wherein the first and second arms are about 90° apart.

Example 8 includes the aircraft of any of Examples 4-7, wherein the first arm is longer than the second arm.

Example 9 includes the aircraft of any of Examples 1-8, wherein the trailing edge link is curved between the first and second ends of the trailing edge link.

Example 10 includes the aircraft of any of Examples 1-9, wherein the first end of the trailing edge link is rotatably coupled to a rib in the fixed wing portion.

Example 11 includes the aircraft of any of Examples 1-10, further including an actuator to rotate the fore panel upward or downward relative to the fixed wing portion.

Example 12 includes the aircraft of any of Examples 1-11, wherein the aft panel is disposed in a notch in the fore panel.

Example 13 includes the aircraft of Example 12, wherein an aft edge of the fore panel and an aft edge of the aft panel are aligned when the trailing edge control surface is in a neutral position.

Example 14 is an aircraft including a wing including a fixed wing portion and a trailing edge control surface. The trailing edge control surface includes a fore panel rotatably coupled to the fixed wing portion and an aft panel rotatably coupled to the fore panel. The wing also includes an actuator to rotate the fore panel relative to the fixed wing portion and a linkage assembly coupled between the fixed wing portion, the fore panel, and the aft panel. The linkage assembly is configured to rotate the aft panel downward relative to the fore panel when the fore panel is rotated downward by the actuator, and rotate the aft panel upward relative to the fore panel when the fore panel is rotated upward by the actuator.

Example 15 includes the aircraft of Example 14, wherein the linkage assembly includes a rocking lever rotatably coupled to a bottom side of the fore panel, a trailing edge link coupled between the fixed wing portion and the rocking lever, and an aft panel link coupled between the rocking lever and the aft panel.

Example 16 includes the aircraft of Example 15, wherein the rocking lever has a first arm and a second arm extending in different directions, and wherein the trailing edge link is coupled to the first arm, and the aft panel link is coupled to the second arm.

Example 17 includes the aircraft of any of Examples 14-16, wherein the actuator is a linear actuator.

Example 18 includes the aircraft of Example 17, wherein the actuator has a movable rod, and wherein a distal end of the rod is coupled to the fore panel.

Example 19 is a method including activating an actuator to rotate a fore panel of a trailing edge control surface downward relative to a fixed wing portion of a wing of an aircraft. The trailing edge control surface includes an aft panel rotatably coupled to the fore panel. The wing further includes a linkage assembly coupled between the fixed wing portion, the fore panel, and the aft panel. When the actuator rotates the fore panel downward relative to the fixed wing portion, the linkage assembly rotates the aft panel downward relative to the fore panel.

Example 20 includes the method of Example 19, further including activating the actuator to rotate the fore panel upward relative to the fixed wing portion. When the actuator rotates the fore panel upward relative to the fixed wing portion, the linkage assembly rotates the aft panel upward relative to the fore panel.

Although certain example methods, apparatus, systems, and articles of manufacture have been disclosed herein, the scope of coverage of this patent is not limited thereto. On the contrary, this patent covers all methods, apparatus, systems and articles of manufacture fairly falling within the scope of the claims of this patent.

The following claims are hereby incorporated into this Detailed Description by this reference, with each claim standing on its own as a separate embodiment of the present disclosure.

What is claimed is:

1. An aircraft comprising:
    a wing including:
        a fixed wing portion;
        a trailing edge control surface including:
            a fore panel rotatably coupled to the fixed wing portion; and
            an aft panel rotatably coupled to the fore panel; and
        a linkage assembly including:
            a rocking lever rotatably coupled to a bottom side of the fore panel;
            a trailing edge link having a first end rotatably coupled to the fixed wing portion and a second end rotatably coupled to the rocking lever; and
            an aft panel link having a first end rotatably coupled to the rocking lever and a second end rotatably coupled to a bottom side of the aft panel.

2. The aircraft of claim 1, wherein the trailing edge control surface is an aileron.

3. The aircraft of claim 2, wherein the aft panel is a tab.

4. The aircraft of claim 1, wherein the rocking lever has a first arm and a second arm extending in different directions.

5. The aircraft of claim 4, wherein the second end of the trailing edge link is rotatably coupled to the first arm, and the first end of the aft panel link is rotatably coupled to the second arm.

6. The aircraft of claim 5, wherein the rocking lever is rotatably coupled to the bottom side of the fore panel at an intersection of the first and second arms.

7. The aircraft of claim 6, wherein the first and second arms are about 90° apart.

8. The aircraft of claim 6, wherein the first arm is longer than the second arm.

9. The aircraft of claim 1, wherein the trailing edge link is curved between the first and second ends of the trailing edge link.

10. The aircraft of claim 1, wherein the first end of the trailing edge link is rotatably coupled to a rib in the fixed wing portion.

11. The aircraft of claim 1, further including an actuator to rotate the fore panel upward or downward relative to the fixed wing portion.

12. The aircraft of claim 1, wherein the aft panel is disposed in a notch in the fore panel.

13. The aircraft of claim 12, wherein an aft edge of the fore panel and an aft edge of the aft panel are aligned when the trailing edge control surface is in a neutral position.

14. An aircraft comprising:
a wing including:
a fixed wing portion;
a trailing edge control surface including:
a fore panel rotatably coupled to the fixed wing portion; and
an aft panel rotatably coupled to the fore panel; and
an actuator to rotate the fore panel relative to the fixed wing portion; and
a linkage assembly coupled between the fixed wing portion, the fore panel, and the aft panel, the linkage assembly configured to rotate the aft panel downward relative to the fore panel when the fore panel is rotated downward by the actuator, and rotate the aft panel upward relative to the fore panel when the fore panel is rotated upward by the actuator.

15. The aircraft of claim 14, wherein the linkage assembly includes:
a rocking lever rotatably coupled to a bottom side of the fore panel;
a trailing edge link coupled between the fixed wing portion and the rocking lever; and
an aft panel link coupled between the rocking lever and the aft panel.

16. The aircraft of claim 15, wherein the rocking lever has a first arm and a second arm extending in different directions, and wherein the trailing edge link is coupled to the first arm, and the aft panel link is coupled to the second arm.

17. The aircraft of claim 14, wherein the actuator is a linear actuator.

18. The aircraft of claim 17, wherein the actuator has a movable rod, and wherein a distal end of the rod is coupled to the fore panel.

19. A method comprising:
activating an actuator to rotate a fore panel of a trailing edge control surface downward relative to a fixed wing portion of a wing of an aircraft, the trailing edge control surface including an aft panel rotatably coupled to the fore panel, the wing further including a linkage assembly coupled between the fixed wing portion, the fore panel, and the aft panel, wherein, when the actuator rotates the fore panel downward relative to the fixed wing portion, the linkage assembly rotates the aft panel downward relative to the fore panel; and
activating the actuator to rotate the fore panel upward relative to the fixed wing portion, wherein, when the actuator rotates the fore panel upward relative to the fixed wing portion, the linkage assembly rotates the aft panel upward relative to the fore panel.

20. The method of claim 19, wherein the linkage assembly includes:
a rocking lever rotatably coupled to a bottom side of the fore panel;
a trailing edge link coupled between the fixed wing portion and the rocking lever; and
an aft panel link coupled between the rocking lever and the aft panel.

* * * * *